United States Patent [19]

Minami et al.

[11] Patent Number: 4,825,362

[45] Date of Patent: Apr. 25, 1989

[54] NETWORK SYSTEM FOR DATA COMMUNICATION IN A VEHICLE

[75] Inventors: Kazuaki Minami, Anjo; Yuji Hirabayashi, Chita; Katsuhiro Ina, Okazaki; Katsunori Ito, Ama; Susumu Akiyama, Kariya; Hidemichi Tanabe, Nagoya, all of Japan

[73] Assignee: Nippondenso Co., Ltd., Kariya, Japan

[21] Appl. No.: 947,431

[22] Filed: Dec. 29, 1986

[30] Foreign Application Priority Data

Dec. 25, 1985 [JP] Japan .................................. 60-295072

[51] Int. Cl.⁴ ..................... G06F 15/16; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,676,858 | 7/1972 | Finch et al. | 364/200 |
| 4,003,032 | 1/1977 | Austin et al. | 364/200 |
| 4,344,132 | 8/1982 | Dixon et al. | 364/200 |
| 4,558,429 | 12/1985 | Barlow et al. | 364/900 |
| 4,638,476 | 1/1987 | Acampora et al. | 370/83 |

OTHER PUBLICATIONS

1984–IEEE—Local Area Network Technology Applied to Automotive Electronic Communications—by Ronald W. Cox.
A Small Area Network for Cars—by Ronald L. Mitchell, MOS Microprocessor Div. Signetics Corp.

Primary Examiner—Eddie P. Chan
Attorney, Agent, or Firm—Cushman, Darby & Cushman

[57] ABSTRACT

A data network system for a vehicle having a plurality of separate and distinct control computers carrying out a predetermined control function of the vehicle and a data communication line for communicating data among the control computers. One of the control computers determines the number of the other computers which are linked with the data communication line, and in response to that number a data transfer rate output from each of the control computers to the data communication line is determined.

4 Claims, 7 Drawing Sheets

NETWORK SYSTEM FOR DATA COMMUNICATION IN A VEHICLE

BACKGROUND OF THE INVENTION

The present invention relates to a data communication network for interconnecting a plurality of control computers mounted on a vehicle utilizing a data communication line.

There has been a recent trend to computerizing various vehicle systems. Often there are a multiplicity of control computers such as an engine control computer for controlling the operation of the vehicle's internal combustion engine in a highly accurate manner, a transmission control computer for automatically controlling a transmission device and a speed control computer for regulating a travelling speed to a desired value. Heretofore, these control computers have functioned independently. This requires much wiring duplication because often multiple computers are wired to the same sensor because they need the same information.

To cope with this problem, a network system for vehicles is utilized. Data is communicated among computers by linking on a common data communication line. However, in a motor vehicle there are problems in sharing data by various computers. First, various types of computers have already been developed. These computers are used in different "combinations". Secondly, some of these computers are marketed as optional products. As the number of optional products utilized increases, data flowing on the communication line increases in volume. The transfer of control data among the individual computers becomes inadequate.

If the data communication rate among the computers is fixed so as to allow for the maximum number of optional control computers, i.e. the highest volume of data possible, the communication data rate must be quite high. However, at high data rates, data cannot be transmitted error free in a motor vehicle environment. There are increased influences caused by electromagnetic noise or the like generated from the engine, the electromagnetic noise causing data corruption in the communication line. As a result, communication among the computers becomes unreliable.

SUMMARY OF THE INVENTION

Accordingly, it is a primary object of the present invention to provide a vehicle network system for communicating data among a multiplicity of computers which is less susceptible to disruption by noise inherent in a motor vehicle environment and which can maintain good communication even when the data on the communication line of the network is being transferred at a high data rate.

According to one aspect of the invention there is provided a network for data communication wherein a data transfer rate of the respective computers connected to the network is rendered variable according to the volume of data that is being transferred by the network.

A plurality of control computers are all connected to a single data communication line. A master computer, also connected to that data communication line, monitors the network and determines and sets a data transfer rate commensurate with the volume of data that must be transferred among the various control computers connected to the network.

When optional product control computers such as, for example, an air conditioner control computer, are networked with the control computers of the control system which are standard-incorporated in the network, the master computer determines that there is a need to increase the volume of data being handled by the network. Accordingly, it increases the baud rate of data transfer. That is, the network is constructed in a highly suitable state for various purposes and expansibility. Since the data transfer rate used by each control computer is set by a command signal from the master computer indicative of the volume of data that must be transferred, data transfer efficiency is optimized by always using the lowest possible baud rate (which is the most reliable). Also, since it is known approximately what volume of data control computers need to transfer, the overall (collective) volume of data can be determined by detecting the number of computers linked to the network.

BRIEF DESCRIPTION OF THE DRAWINGS

Presently preferred exemplary embodiments of the invention will be described in detail with reference to the accompanying drawings in which.

DETAILED DESCRIPTION OF THE PREFERRED EMBODIMENTS

Figure 1:
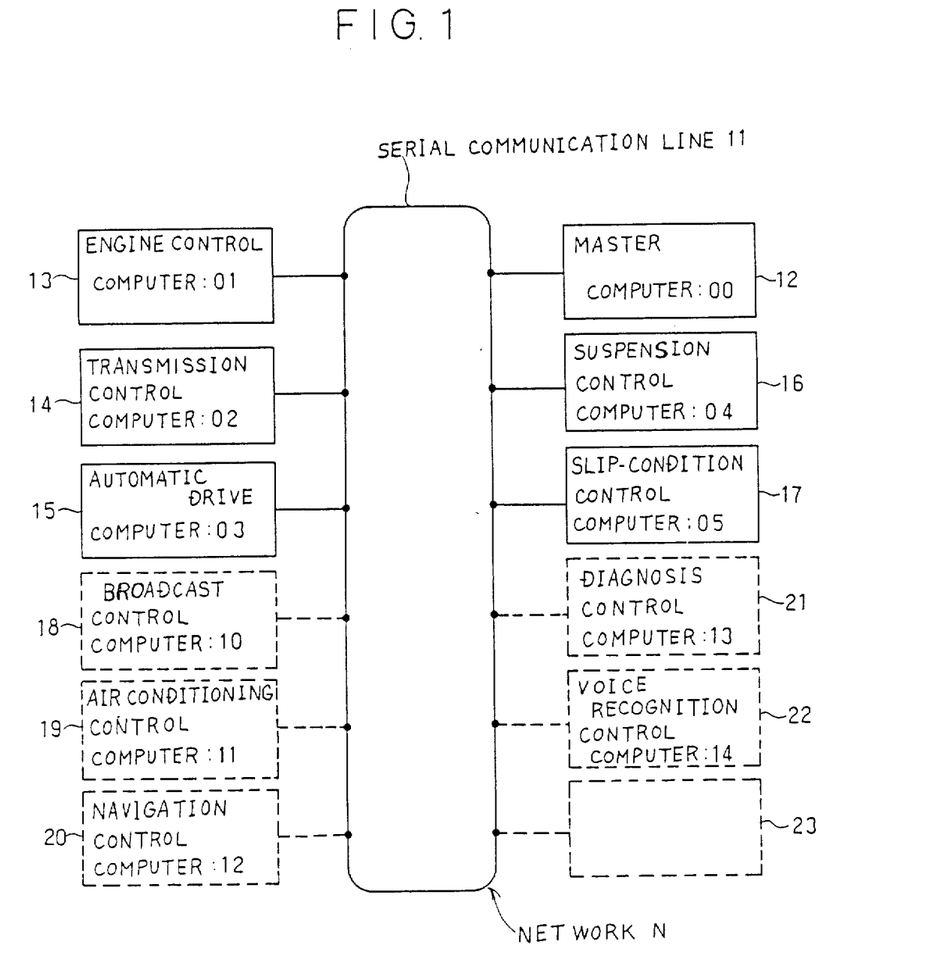
FIG. 1 is a block diagram of the invention.

FIG. 1 is a general block diagram of the invention.

A network N comprises a master computer 12, a plurality of slave computers 13-23 and a serial communication line 11 which links all these computers 12-23 which are separately mounted on a vehicle. Various of the linking computers 12-23, each having its own particular control function, produce processed serial data and provide that data to serial communication line 11. The processed serial data is transferred to other of the linking computers 12-23 via serial communication line 11 so that the other computers may, as needed, utilize the transferred serial data to carry out its own control function. Master computer 12, which is preferably provided with a display for human interface, outputs in sequence polling signals to slave computers 13-23 to detect how many slave computers 13-23 are working and to determine in response to that number a data communication rate and polling time interval. Slave computers 13-23 include standard-equipment computers 13-17 which are provided in all vehicles which are equipped with the present invention, and optional control computers 18-22 which can be provided in the vehicle in accordance with options that the user has purchased.

In this embodiment, standard-equipment computers 13-17 include an engine control computer 13, a transmission control computer 14, an automatic drive computer 15, a suspension control computer 16, and a slip-condition control computer 17. Various "optional" control computers may be linked to serial communication line 11. For example, a broadcast receiving control computer 18 suitable for a radio, a TV set or the like in the vehicle, air conditioning control computer 19 for controlling air conditioning in the passenger compartment of the vehicle, a navigation control computer 20 for controlling navigation of the vehicle, a diagnosis control computer 21 for diagnosing various kinds of appliances, sensors and other computers which are mounted on the vehicle, and a voice recognition control computer 22 for controlling the various appliances of the vehicle by recognizing a driver's voice command. In addition, a computer 23 for controlling other optional products is properly connected to serial communication line 11.

Control computers 13 to 22 independently function to carry out their respective control functions (air conditioning, navigation, etc.). For example, control computer 13 computes a quantity of fuel injection and engine control data at the time of ignition based on fetched data indicative of engine rotation speed, suction air amount and cooling water temperature. Computer 13 then controls the engine in a manner most suitable for the operational condition of the engine under the sensed conditions.

The various electronic control functions are independently carried out by control computers 13 to 22. However, the data computed by each computer and the detection data on which computations are made are sent out onto serial communication line 11 after being converted into a suitable serial format. The serial data are arranged to be usable for other control computers with a view to performing more effective controls by the various individual computers. For example, diagnosis computer 21, connected to serial communication line 11, receives serial data indicative of conditions of various of the other computers coupled to the communication line 11. It is therefore possible to efficiently diagnose automotive problems in a service garage.

Figure 2:
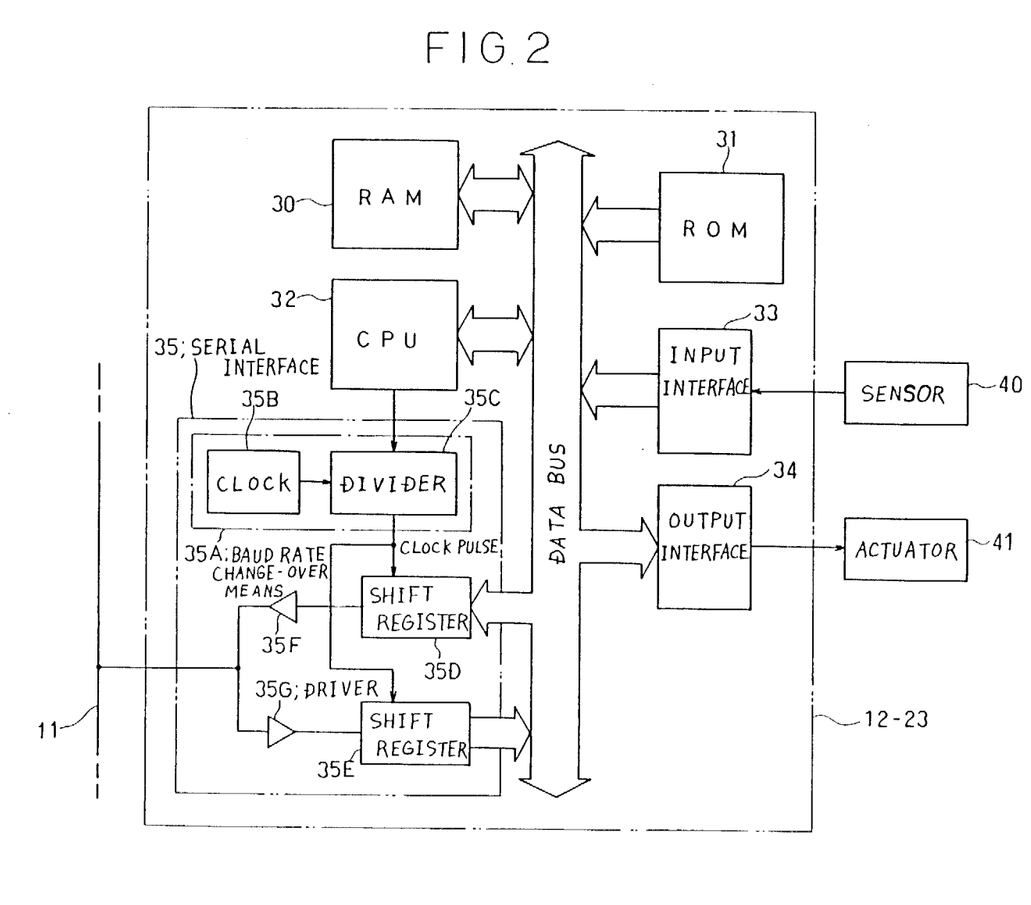
FIG. 2 is a more detailed block diagram showing the configuration of each of computers 12-23.

The respective computers are shown in block diagram in FIG. 2. Each computer includes a RAM 30 for temporarily storing various data, a ROM 31 for storing preset control programs and various constants or the like, a CPU 32 for effecting arithmetic processing to control various kinds of actuators 41 on the basis of the control programs, an input interface 33 for receiving signals from various sensors 40 and providing corresponding signals to CPU 32 by converting the received signals into digital form, an output interface 34 for converting digital signals output from the CPU 32 into control signals for the actuators 41 and a serial interface 35 for sending digital signals from the CPU 32 onto serial communication line 11 by converting the digital signals into a serial form.

Serial interface 35 is provided with a baud rate changeover means 35A for changing the baud rate of data according to a command from CPU 32. The baud rate changeover means 35A comprises a clock circuit 35B producing a basic clock signal whose frequency is 9600 Hz, and variable divider, 35C for dividing the basic clock signal into a 4800 Hz signal and a 2400 Hz signal in response to a baud rate change command from CPU 32. The basic clock signal and each divided signal is output to shift registers 35D and 35E.

Shift register 35D converts the parallel data from CPU 32 into serial data on the basis of the signal from divider 35C. This serial data is coupled to serial communication line 11 by driver 35F. Shift register 35E converts the serial data from driver 35G into parallel data on the basis of the signal from divider 35C. This CPU 32 controls the baud rate of data flowing from and to the computer.

Master computer 12 and slave computers 1323 are respectively addressable by discernment code numbers such as, for example, 00-14, as shown in FIG. 1. Whenever a new electronic control system is mounted on the vehicle, the control system is assigned a discernment code number and is then connected to serial communication line 11 as shown.

Network N includes a plurality of the computers coupled to one another via a serial data line 11. A good number of the control computers 13 to 23 which are connected to the network N and operating are arranged to be monitored by master computer 12. Master computer 12 sequentially polls slave computers 13–23 using the various discernment codes which are memorized in master computer 12. Master computer 12 judges the responses to this polling. Particularly, as for optional computers 18–23, if there is no response, it is deemed that they are not linked to serial communication line 11; and hence a subsequent communication with such computer is not attempted.

Figure 3:
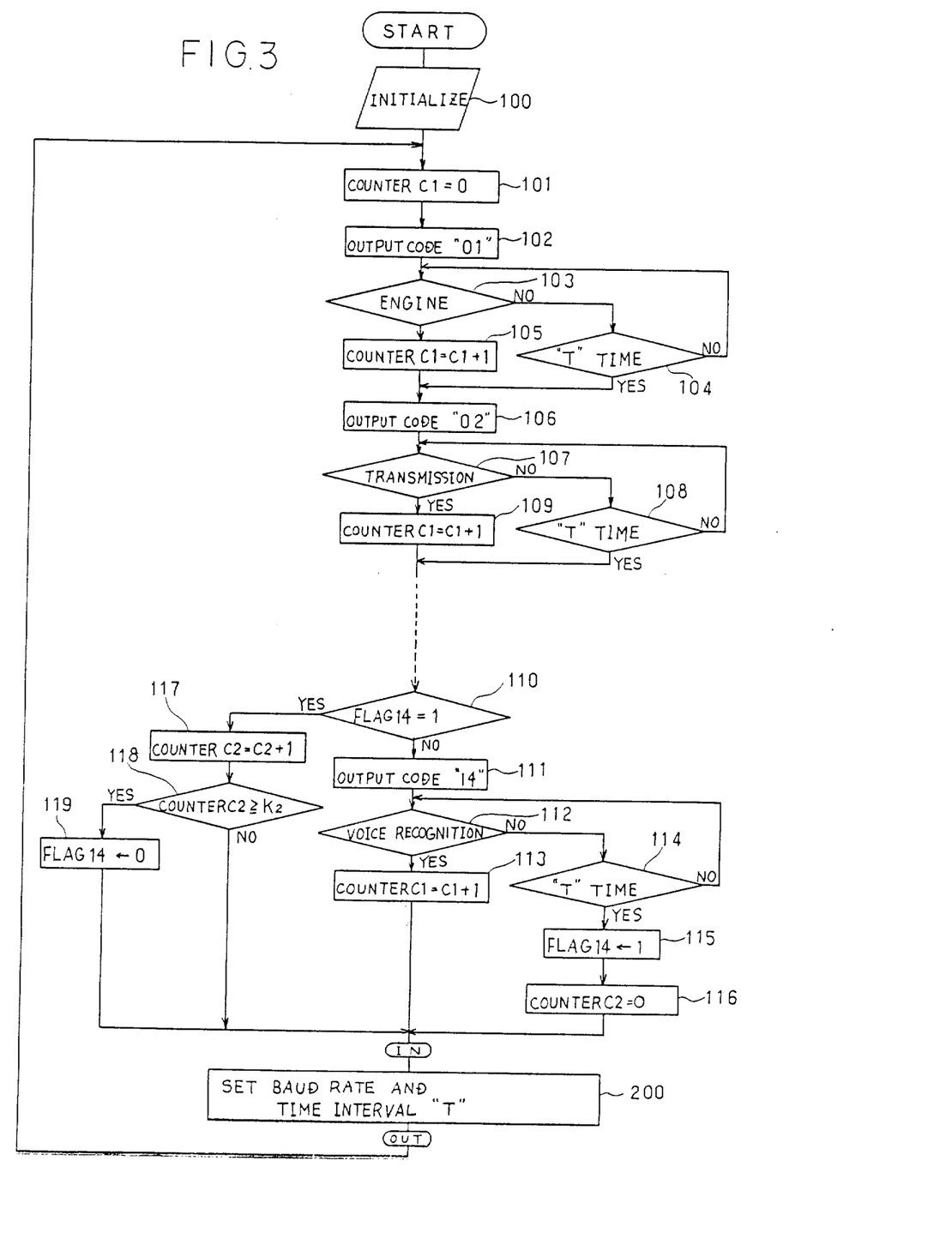
FIG. 3 is a flow chart of a polling operation carried out by master computer 12 and data transfer that occurs in response to polling in accordance with a first embodiment of the present invention.

FIG. 3 is a flow chart of a polling operation carried out by master computer 12 and data transfer that occurs in response to the polling operation.

The FIG. 3 routine begins when the ignition switch is turned on and ends only when the ignition switch is turned off. The cycle from step 101 through step 200 continues to be carried repetitiously while the vehicle is operated. In a first step 100, the program initializes data in the RAM of master computer 12, and, more specifically, the baud rate is set to a maximum value 9600 baud and stored in RAM 30 of master computer 12. The polling time interval "T" is set to a minimum value $T_3$ and stored in RAM 30. Further, FLAGS 10–14, which are provided in RAM 30 in accordance with the discernment code 10–14 of optional computers 18–22, are all set to 0.

After initialization at step 100, control moves to step 101 where a counter C1 provided in master computer 12 is set to 0. In a step 102, a discernment 01 is output from the master computer 12 to the line 11. In a step 103, it is judged whether or not there is a response from engine control computer 13 corresponding to discernment code 01 which was generated at step 102. If the engine control computer 13 is operating, engine control computer 13 outputs a corresponding signal including its discernment code and data such as, for example, engine rotating speed, to serial communication line 11. Accordingly, master computer 12 determines that engine control computer 13 is linked to line 11 and is an operational part of network N. At step 105 the count of the counter C1 (previously initialized at step 101) is incremented by +1. If there is no response from engine control computer 12, at step 104 there is a "wait" until a specified time "T" (previously set to $T_3$ at step 100) has lapsed.

In the wake of step 105, or if it is confirmed that time T has lapsed in step 104, program control moves to a step 106 where the discernment code 02 is output to serial communication line 11 in order to check whether transmission computer 14 is operating. After this, in a step 107, it is judged whether there is a response from the transmission control computer 14 which corresponds to discernment code 02. If not, a step 108 causes a wait until the time T lapses. If it is confirmed that there is a response in step 107, the value of the counter is incremented by +1 in a step 109, and program control moves to the next step, and so on, until all discernment codes have been output.

Thus, the discernment codes of the various control computers which are thought to be operating are sequentially output fro master computer 12 to the serial communication line 11 and it is judged for each whether or not there is any response. Every time there is a response, the value of the counter is incremented by +1. Consequently, the counting value of the counter corresponds to the number of the control computers which are operating.

After polling standard-equipped computers 13–17, the optional computers 18–22 are polled. At step 110 it is determined whether a FLAG 14 (initialized to "0" at step 100) is set to "1" or not. If not, program control moves to step 111, 112 where voice recognition computer 22 is polled and it is determined whether there is a response from it or not. If there is a response, the value of the counter C1 is incremented by +1. If there is no response during time "T" in step 114, program control moves to step 115 where the FLAG 14 is set to "1". Program control then moves to step 116 where a counter C2 provided in master computer 12 is set to "0".

Figure 5A:
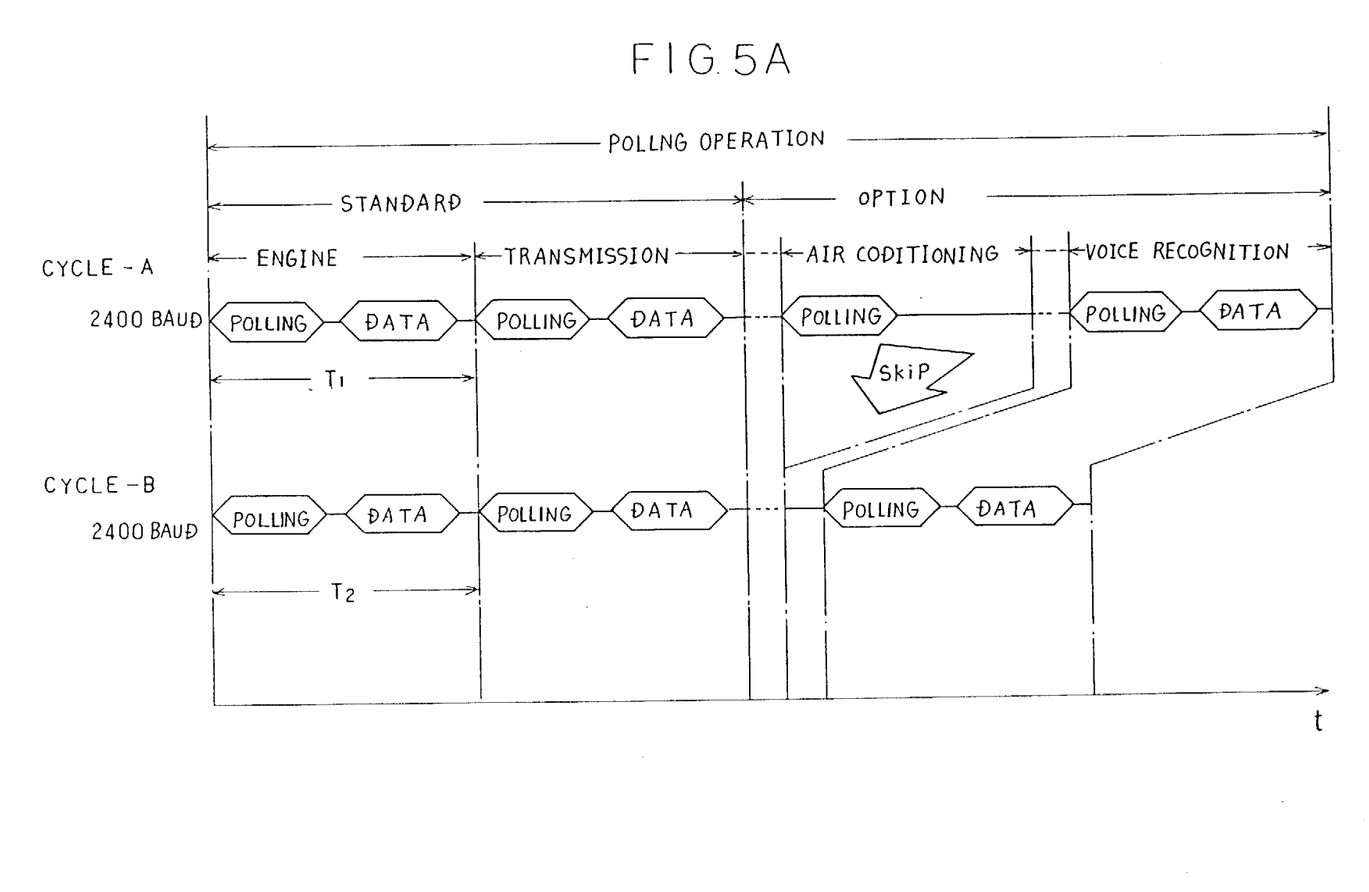
FIGS. 5A and 5B are timing diagrams showing polling carried out by master computer 12 and data transfer carried out by slave computers 13-22.

At step 110, if it is determined that the FLAG 14 is 1, program control moves to step 117 where the counter C2 is incremented by +1, and then to step 118. At step 118, if the value of the counter C2 is more than K (a constant selected for determining how long to wait before a non-responsive computer again), control moves to step 119 where the FLAG 14 is set to "0". If not, control moves directly to step 200. Thus, FLAG 14 holds the information determining the "skipping" of previously non-responsive optional computers. In this polling operation, master computer 12 always polls standard-equipped computers 13–17 whether or not it responded to a previous poll. However, if one of the optional control computers did not respond to a polling from the master computer 12 during a polling cycle, master computer 12 skips the polling of the nonresponsive optional control computer at a following poll until K polling cycles have occurred. For example, if air conditioning control computer 19 did not respond at CYCLE-A as shown in FIG. 5A, master computer 12 skips the polling for the air conditioning control computer 19 at a CYCLE-B. This decreases the number of the optional control computers which are operatively connected to serial communication line 11 thereby making the total time period of the polling operation shown in FIG. 5A shorter. After polling, baud rate control and time interval control is carried out at step 200.

Figure 4:
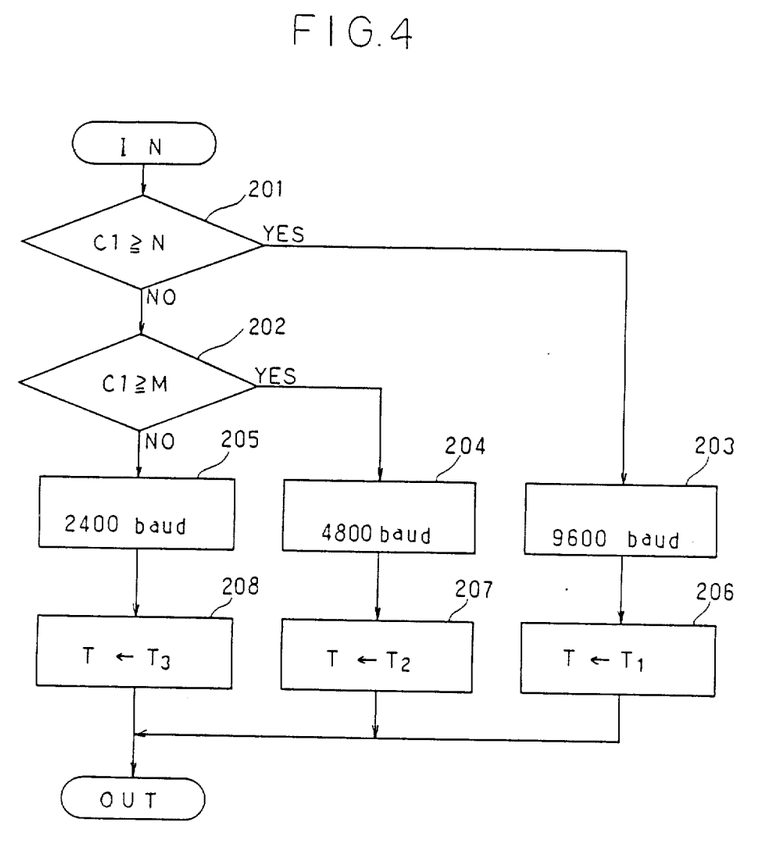
FIG. 4 is a detailed flow chart of step 200 of FIG. 3.

FIG. 4 is a detailed flow chart of step 200 of FIG. 3.

On the basis of the counting value of the counter C1, when polling is finished step 201 is to judge whether or not the number of operating devices connected to serial communication line 11 exceeds a preset value N.

Figure 5B:
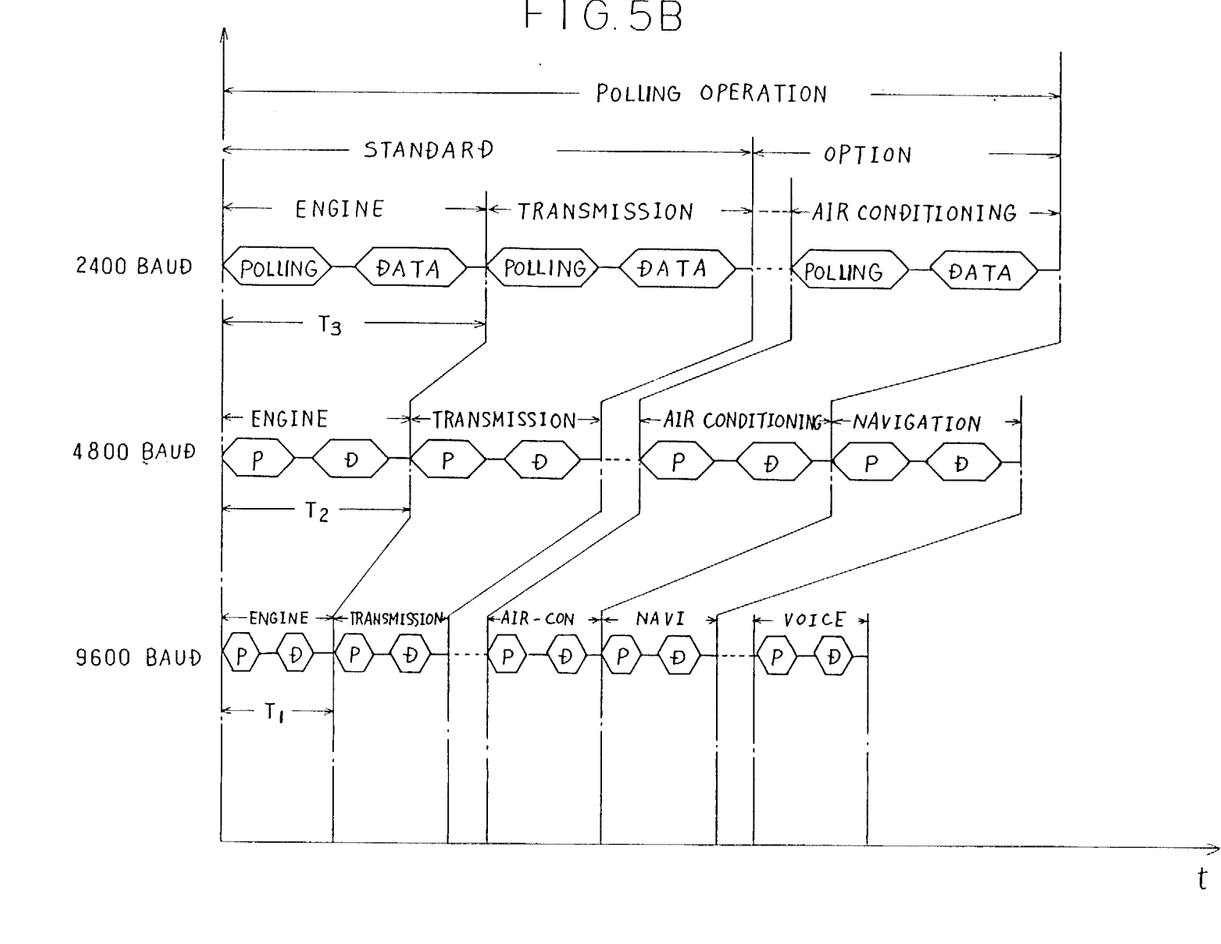

According to the setting of the baud rate to 9600 baud, 4800 baud, or 2400 baud, the polling time interval T is respectively set to $T_1$, $T_2$, or $T_3$ at steps 203, 206, or 202, 204, 207 or 202, 205, 208, respectively. Accordingly, increasing the baud rate makes each polling time interval short as shown in FIG. 5B. As a result, even if the number of polling operations for the linking computers increases, the total time length of the polling cycle is not so much.

Master computer 12 which executes the above-mentioned polling operation monitors other control computers and then displays information about the thus monitored data, the master computer being arranged to properly perform display control. Master computer 12 may be so constituted to display the data totaled therein to an outside computer using an output device connected to serial communication line 11.

In the thus constituted device, a plurality of the electronic control systems each of which control a different vehicle function are connected to the common network N. The respective systems are operation-controlled more effectively than if they were not networked; and at the same time the individual control computers are totally monitored by the master computer 12. Furthermore, to this network N are readily linked the optional control computers which are simultaneously monitored by the master computer. The architecture of the system according to the present invention thus makes it easily expandable. The communication data rate is always set to the maximum rate at which reliable communication can take place among the various control computers. Thus, control is carried out in a highly efficient manner.

In the above-described embodiment, the volume of data in the network is determined by detecting the number of operating computers connected to serial communication line 11. However, for the purpose of more precisely detecting the volume of data, a "weight" of the counting value that is counted by the master computer 12 may be used to compensate for the fact that some computers contribute more data volume than others to the network N.

Figure 6:
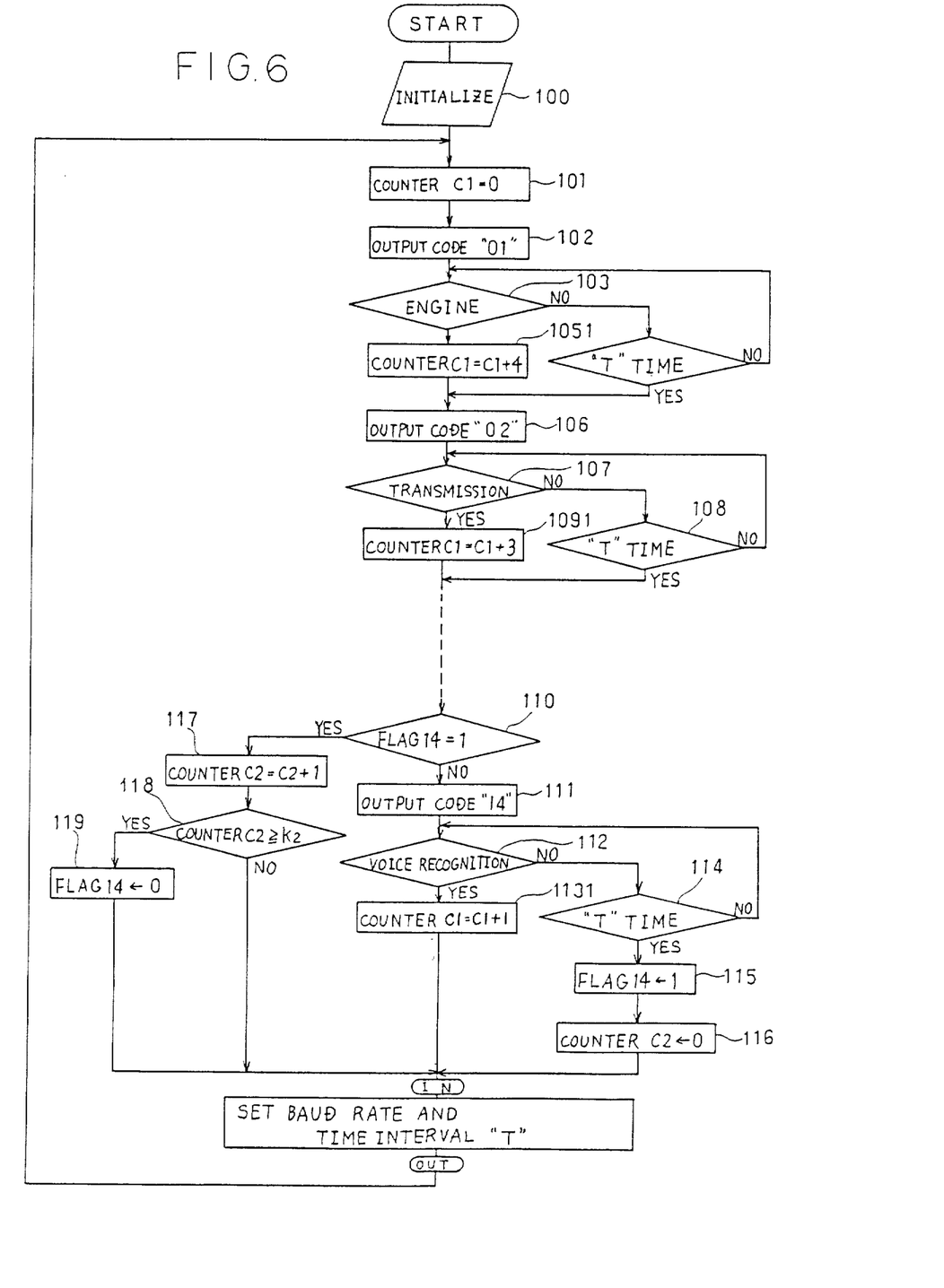
FIG. 6 is a flow chart of a polling operation carried out by master computer 12 and data transfer that occurs in response to polling in accordance with a second embodiment of the present invention.

Namely, as shown in FIG. 6 which substantially corresponds to FIG. 4, the value of the counter C1 is incremented by +4 in a step 1051, because engine control computer 13 has a great deal of data to be processed. However, the transmission computer 14 has a relatively small amount of data to be processed as compared with the engine control computer 13, so that the value of the counter is incremented by only +3 in a step 1091. The voice recognition computer has the least amount of data and hence the value of the counter is incremented by +1 in a step 1131.

Therefore, according to this embodiment, even if the operating computers to be connected to the serial communication line 11 are small in number, the baud rate is increased in proportion as the value counted by master computer 12 grows.

What is claimed is:

1. A data network system for a vehicle having a plurality of separate and distinct control computers carrying out a predetermined control function of said vehicle, comprising:

data communication means for communicating data among said control computers;

a master computer, which is one of said control computers, for setting a polling time interval and polling each of said other control computers at said polling time interval to discriminate whether each of said polled computers responds or not;

determination means, provided in said master computer, for determining the number of polled computers which are linked with said data communication means in response to the result of said discrimination by said master computer; and setting means, provided in all said control computers, in response to a command signal from said master computer indicative of the volume of data that must be transferred as a result of said determined number of said polled computers for setting a data transfer speed between each control computer and said data communication means wherein said master computer further sets said polling time interval in response to said determined number of said polled computers.

2. A data network system as claimed in claim 1, wherein said determination means comprises means for counting a number of the computers which are linked with said data communication means.

3. A data network system as claimed in claim 2, wherein said counting means increments by a predetermined number corresponding to each type of control computer connected with said data communication means.

4. A data network system as claimed in claim 1, wherein said data communication means incudes a serial communication line.

* * * * *